United States Patent
Shoemaker, Jr.

(10) Patent No.: US 6,732,926 B2
(45) Date of Patent: May 11, 2004

(54) BARCODE TICKET READER

(76) Inventor: Stephen P. Shoemaker, Jr., 531 N. Francisca Ave., Redondo Beach, CA (US) 90277

(*) Notice: Subject to any disclaimer, the term of this patent is extended or adjusted under 35 U.S.C. 154(b) by 0 days.

(21) Appl. No.: 09/935,055

(22) Filed: Aug. 21, 2001

(65) Prior Publication Data

US 2002/0074406 A1 Jun. 20, 2002

Related U.S. Application Data

(60) Provisional application No. 60/255,637.

(51) Int. Cl.[7] ................................................. G06K 7/10
(52) U.S. Cl. ....................................................... 235/454
(58) Field of Search ............................... 235/419, 454, 235/486, 462; 400/621, 104; 427/555; 101/288; 382/101; 83/426, 349; 250/216, 271; 463/25

(56) References Cited

U.S. PATENT DOCUMENTS

| | | | | |
|---|---|---|---|---|
| 3,614,430 A | * | 10/1971 | Berler | 250/271 |
| 3,763,356 A | * | 10/1973 | Berler | 235/468 |
| 3,855,457 A | * | 12/1974 | Amundson et al. | 235/475 |
| 4,027,142 A | * | 5/1977 | Paup et al. | 235/379 |
| 4,073,234 A | * | 2/1978 | Sato | 101/288 |
| 4,177,377 A | * | 12/1979 | Kuze | 235/419 |
| 4,577,099 A | * | 3/1986 | Goodman | 250/216 |
| 4,704,518 A | * | 11/1987 | Brunn et al. | 235/480 |
| 5,211,093 A | * | 5/1993 | Horniak | 83/426 |
| 5,288,994 A | | 2/1994 | Berson | |
| 5,444,750 A | * | 8/1995 | Stewart et al. | 377/8 |
| 5,448,049 A | * | 9/1995 | Shafer et al. | 235/454 |
| 5,522,921 A | | 6/1996 | Custer | |
| 5,684,286 A | * | 11/1997 | Pierce | 235/454 |
| 5,730,533 A | * | 3/1998 | Noy et al. | 358/296 |
| 5,833,104 A | * | 11/1998 | Horniak et al. | 225/106 |
| 5,855,969 A | * | 1/1999 | Robertson | |
| 5,971,276 A | | 10/1999 | Sano et al. | |
| 5,996,457 A | * | 12/1999 | Wingeron, Jr. | 83/349 |
| 6,012,832 A | * | 1/2000 | Saunders et al. | |
| 6,048,269 A | * | 4/2000 | Burns et al. | 463/25 |
| 6,110,044 A | * | 8/2000 | Stern | |
| 6,155,491 A | * | 12/2000 | Dueker et al. | 235/440 |
| 6,155,731 A | * | 12/2000 | Bertalan et al. | 101/227 |
| 6,202,929 B1 | | 3/2001 | Verschuur et al. | |
| 6,340,331 B1 | * | 1/2002 | Saunders et al. | 463/25 |
| 6,345,765 B1 | * | 2/2002 | Wiklof | 235/472.01 |
| 6,360,001 B1 | * | 3/2002 | Berger et al. | 382/101 |

* cited by examiner

Primary Examiner—Michael G. Lee
Assistant Examiner—Kumiko C. Koyama
(74) Attorney, Agent, or Firm—Fulwider Patton Lee & Utecht

(57) ABSTRACT

A method to count tickets which includes a translucent ticket with an opaque pattern with translucent portions, including a light source on the first side of the ticket and a detector on a second side of the ticket, providing relative motion between the ticket and the detector. The pattern and translucent portions are detected with the detector.

8 Claims, 8 Drawing Sheets

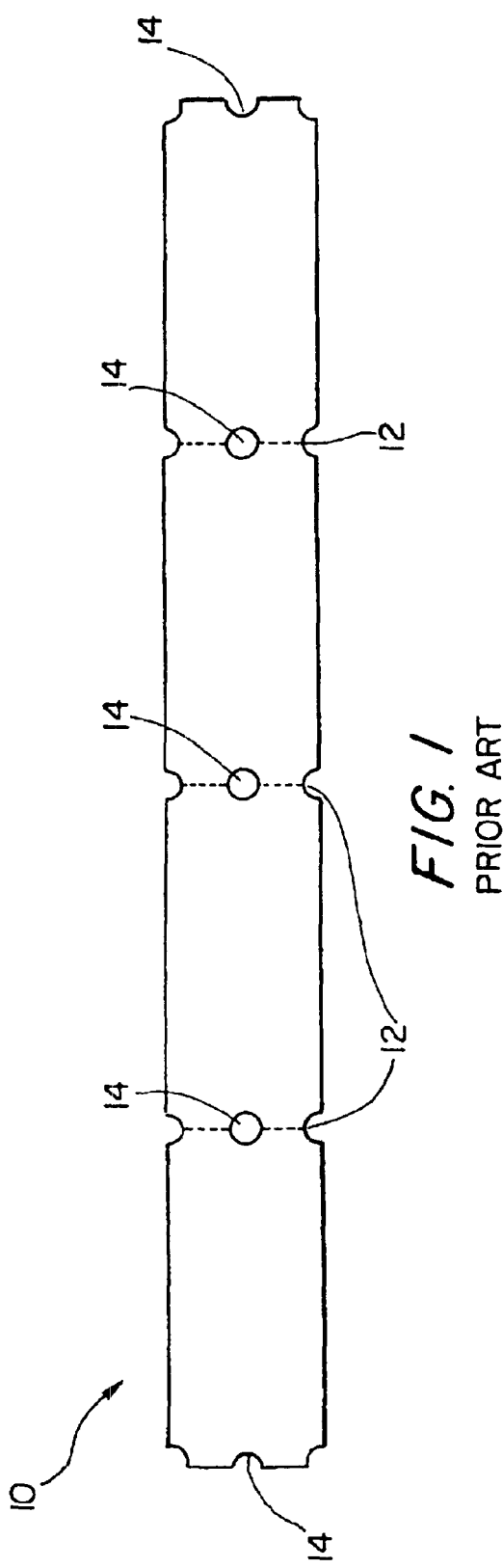
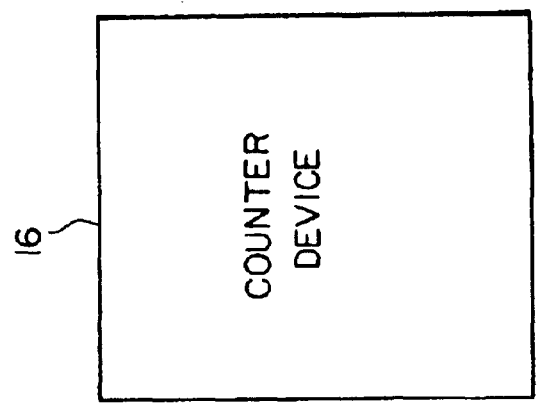
FIG. 1 PRIOR ART
FIG. 2 PRIOR ART

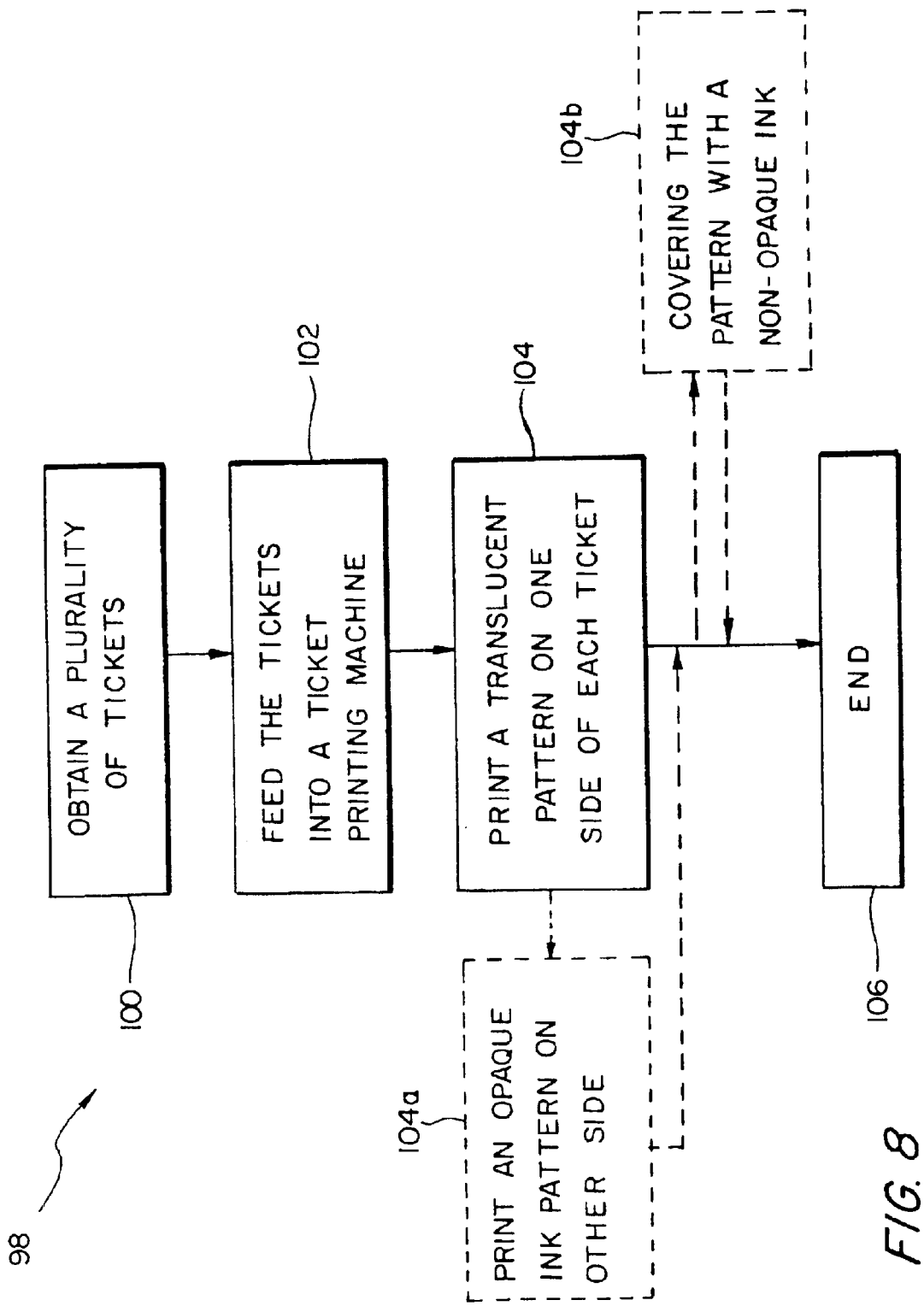

BARCODE TICKET READER

CROSS REFERENCE TO RELATED APPLICATIONS

This application claims the benefit of U.S. Provisional Patent Application No. 60/255,637 filed on Dec. 13, 2000 and is incorporated herein by reference.

FIELD OF THE INVENTION

The present invention relates generally to ticket counting in the amusement industry and more particularly to automatic ticket counting mechanisms.

BACKGROUND OF THE INVENTION

Tickets are a convenient way for proprietors to grant consumers access to goods and services. Typical examples include admission to shows and prize redemption. When tickets are redeemed, it is desirable to accurately count the tickets and keep a running total.

FIG. 1 shows an example set of tickets 10. Each ticket can be separated at perforations 12. At each perforation 12, there is a notch 14 on both ends of a ticket. The notch 14 is commonly used to count tickets, as will be explained subsequently. FIG. 2 shows a top view of tickets 10 being fed into a counter device 16. FIG. 3 shows a side view of tickets 10 being fed into the same counter device 16. Tickets 10 are fed into the counter device 16 as indicated by directional arrow 18. Rollers 20 pull the tickets 10 into the counter device 16. As the tickets 10 are pulled in, the edge of the ticket with the notch 14 (not shown) passes over the illuminator 22 and lens 24. The illuminator 22 sends out illumination which is focused by the lens 24. As the notch 14 reaches the illuminator 22 and the lens 24, illumination passes through notch 14 and is substantially blocked elsewhere by the ticket material. This produces a characteristic analog signal which is detected by a detector 26, and is sent through processing electronics 28. Processing electronics 28 converts the analog signal into a digital signal 30.

The signal strength is dependent on where the focused illumination passes over the notch 14. FIG. 4 shows how the signal strength varies depending on where the focused illumination is read on the notch. Ticket signal 32 was produced from a focused illumination being read at location 34 in notch 36 on ticket 38. For ease of illustration, the ticket 38 and associated notch 36 are shown as a top view. The focused illumination passes through the notch perpendicular to this view, however. Since ticket signal 32 was read at location 34, a high signal strength is observed, above the minimum signal strength needed for detection. Conversely, ticket 40 with associated notch 42 is read at location 44. Location 44 represents a smaller cross-sectional area as compared to location 34. As a result, ticket signal 46 is much lower in magnitude than comparable ticket signal 32. Also, ticket signal 46 is at about the minimum signal strength needed for detection and successful counting of ticket 40 is doubtful. This situation can result when the notch is not evenly divided between the two tickets resulting in a smaller than normal notch and a degraded signal strength. Additional drawbacks to this method include the fact that the ticket must be opaque so that the light does not pass through the ticket. Due to this requirement, dust or contamination can possibly interfere with the operation since they can block light. Also, the notch can be a point of jamming in ticket counting mechanisms since the cutout portion can possibly catch.

Another method of counting tickets involves printing a barcode on the ticket and using one of the widely available barcode scanners to count the ticket. This method, while arguably an improvement over using notches, still has drawbacks. Since a barcode scanner works on reflective principles, a ticket needs to be oriented correctly when inserted into a ticket counting mechanism. Otherwise the scanner will not see the barcode. This can be avoided by printing the barcode on both sides, but that in turn increases the cost of printing and also limits the space that is otherwise available to print information such as advertisements. Additionally, two barcode scanners can be included in the mechanism if both sides of a ticket has a barcode. While this does resolve the orientation issue when loading a ticket into the ticket counter, it significantly adds to the cost of the ticket counter.

Accordingly, what is needed is a tool to accurately count tickets that is not dependent upon variations in ticket notch size or subject to the constraints of typical reflective barcode scanning techniques.

SUMMARY OF THE INVENTION

The present invention provides an apparatus and a method for counting tickets having a printed pattern.

A method to count tickets in accordance with the present invention includes providing a translucent ticket with an opaque pattern with translucent portions, providing a light source on a first side of the ticket, providing a detector on a second side of the ticket and providing relative motion between the ticket and the detector. The pattern and translucent portions are detected with the detector.

An apparatus for counting tickets in accordance with the present invention includes a housing and a transport device coupled to the housing capable of guiding at least one ticket into the housing and the tickets are printed with a pattern. A light source is positioned on a first side of the ticket and a detector positioned on a second side of the ticket. A signal analyzer coupled to the detector is used to analyze the signal provided by the detector.

A method for printing a pattern on a ticket in accordance with the present invention includes obtaining a plurality of translucent tickets, feeding the plurality of translucent tickets into a ticket printing machine, printing an opaque pattern on one side of each individual translucent ticket and covering the opaque pattern with a dark colored non-opaque ink.

An advantage of the present invention is that the pattern only needs to be printed on one side and can be detected independently of the orientation to a detection apparatus. The apparatus and method are suited to quickly and inexpensively count tickets.

Another advantage of the present invention is that it eliminates the need for a notch on both ends of a ticket, reducing the chance that a ticket may get stuck in a ticket counting machine. Another advantage of the present invention is that the pattern does not need to be printed on both sides of a ticket, which reduces printing costs.

These and other advantages of the present invention will become apparent to those skilled in the art after reading the following descriptions and studying the various figures of the drawings.

BRIEF DESCRIPTION OF THE DRAWINGS

FIG. 1 shows a typical set of tickets of the prior art.

FIG. 2 is a top-view illustration of tickets being inserted into a ticket counter of the prior art.

FIG. 8 is an exemplary printing process for printing a pattern on a set of tickets.

DETAILED DESCRIPTION OF THE INVENTION

Figure 3:
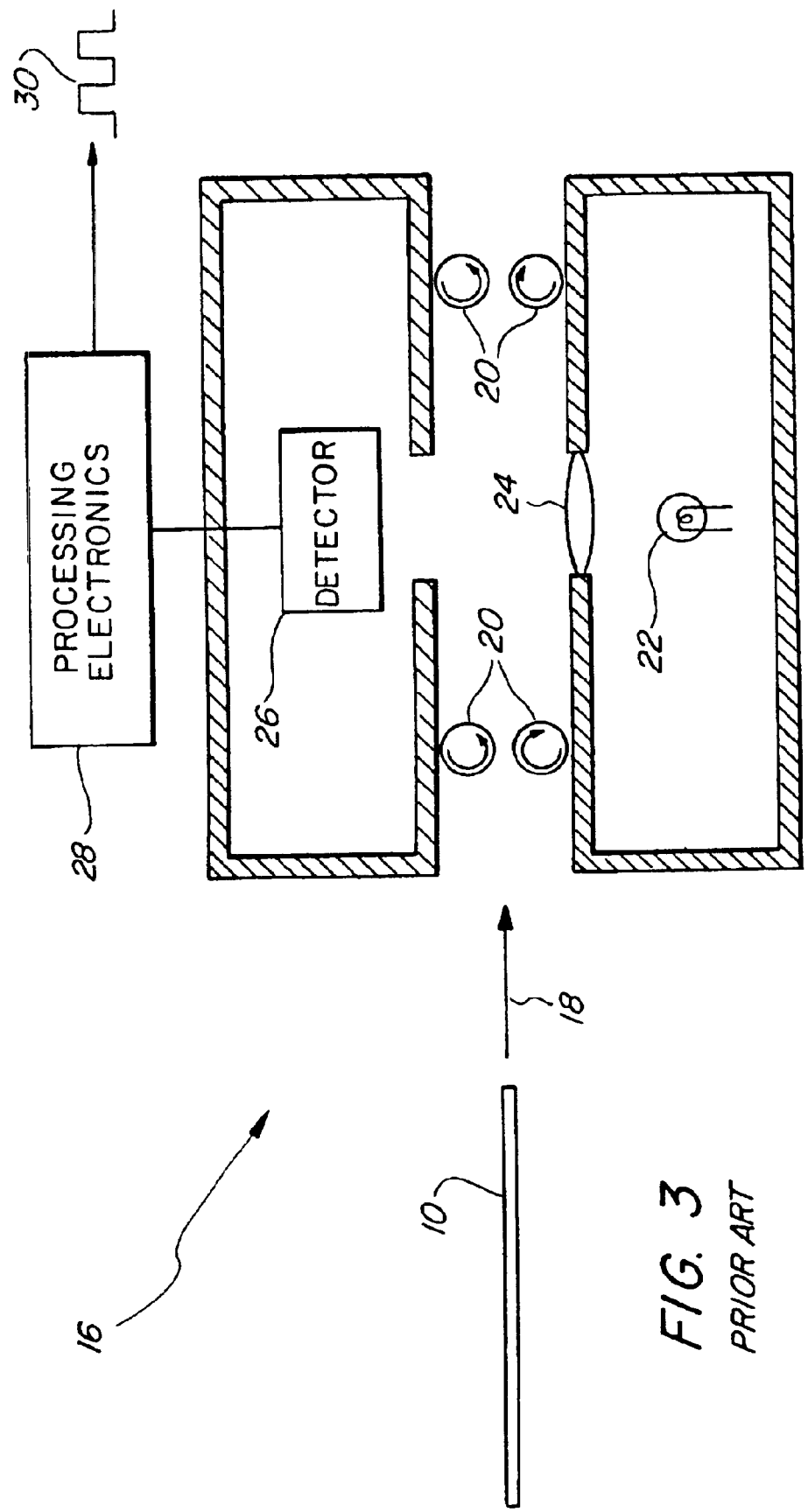
FIG. 3 is a side-view illustration of tickets being inserted into a ticket counter of the prior art.
Figure 4:
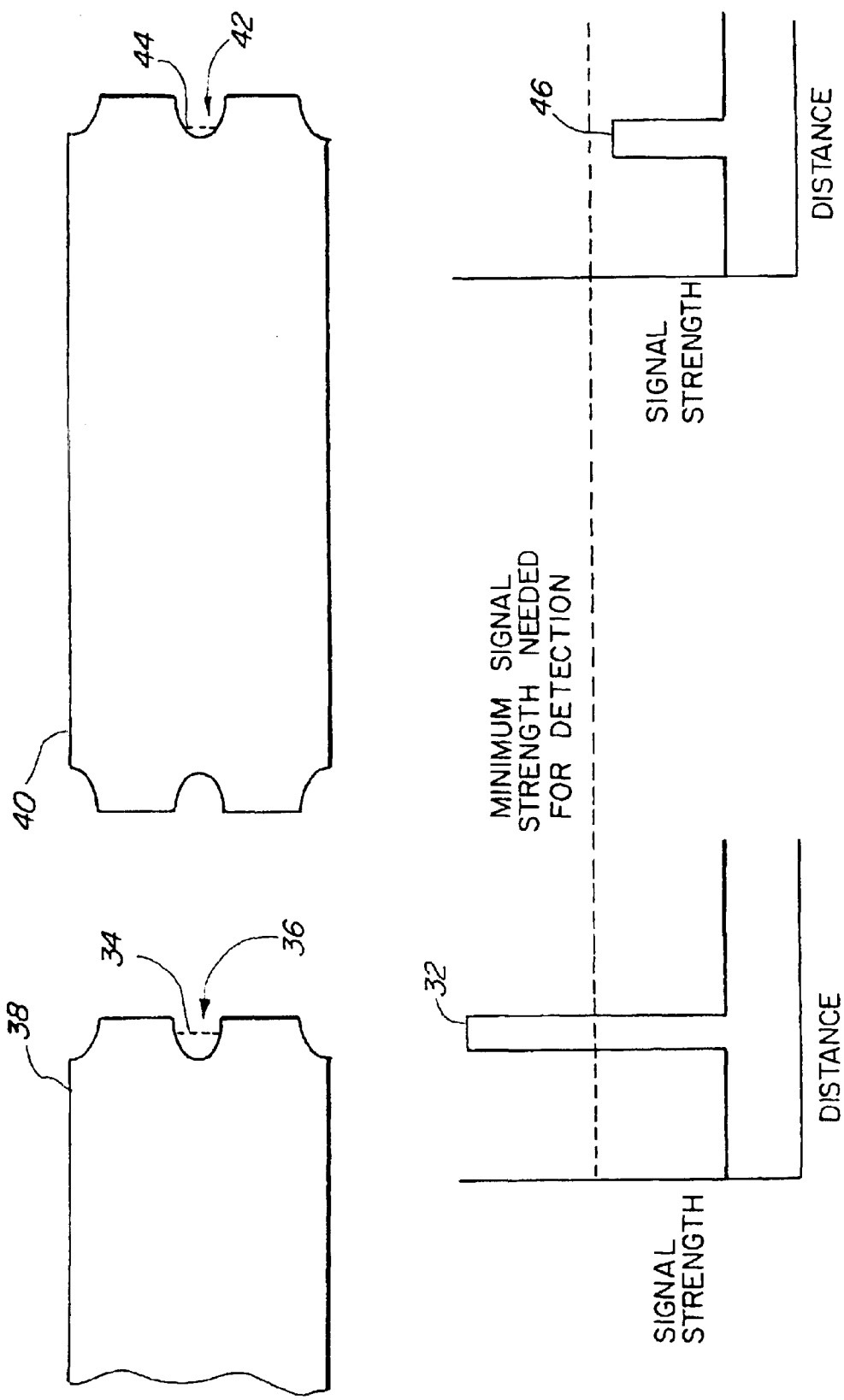
FIG. 4 is an illustration of how tickets are counted in a prior art implementation.
Figure 5:
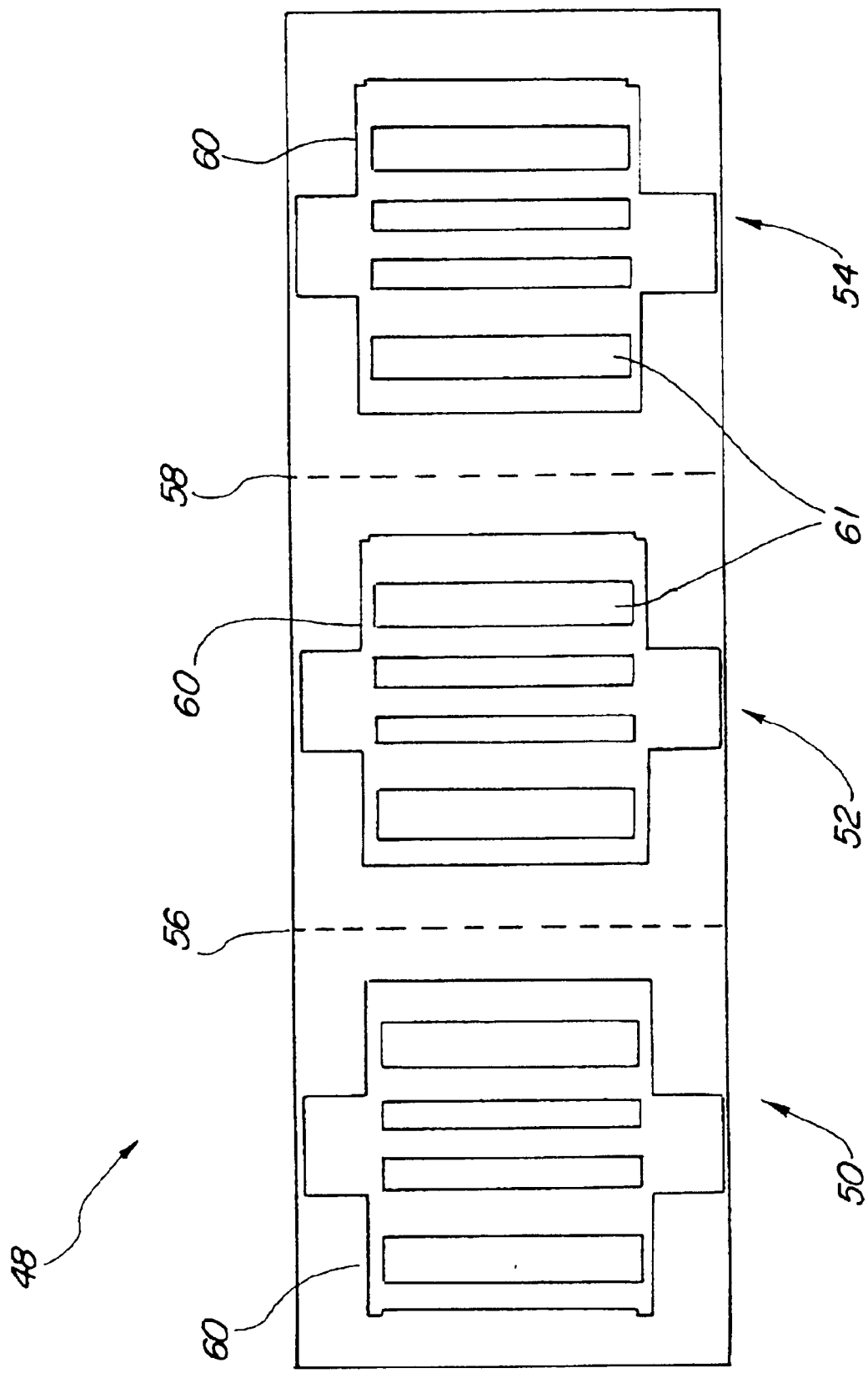
FIG. 5 is an exemplary embodiment of the present invention of a series of tickets.

FIGS. 1–4 were described with reference to the prior art. FIG. 5 is an exemplary embodiment of the present invention of a series of tickets. A set of tickets 48 includes individual tickets 50, 52 and 54. Tickets 50, 52 and 54 can be separated, for example, at perforations 56 and 58. On each of tickets 50, 52 and 54 there is a pattern 60 defining translucent portions 61. As used herein, "translucent" means that electromagnetic radiation (e.g. visible light) can be transmitted through a ticket at the translucent portions to a greater extent than at the pattern 60. The pattern 60 typically are dark/black regions made up of an opaque ink film which greatly reduce the transmission of light through the tickets. The translucent regions permit light to go through the paper ticket to a greater extent than through the ink film pattern. It should be understood that the terms "pattern" and "barcode" can be used interchangeably in the context of the present invention. "Translucent" can range from transparent to relatively opaque as long as the amount of light transmitted through the ticket at the translucent portions is distinguishable from that of the pattern. "Opaque" signifies that significantly less light passes through as compared to "translucent".

Figure 6A:
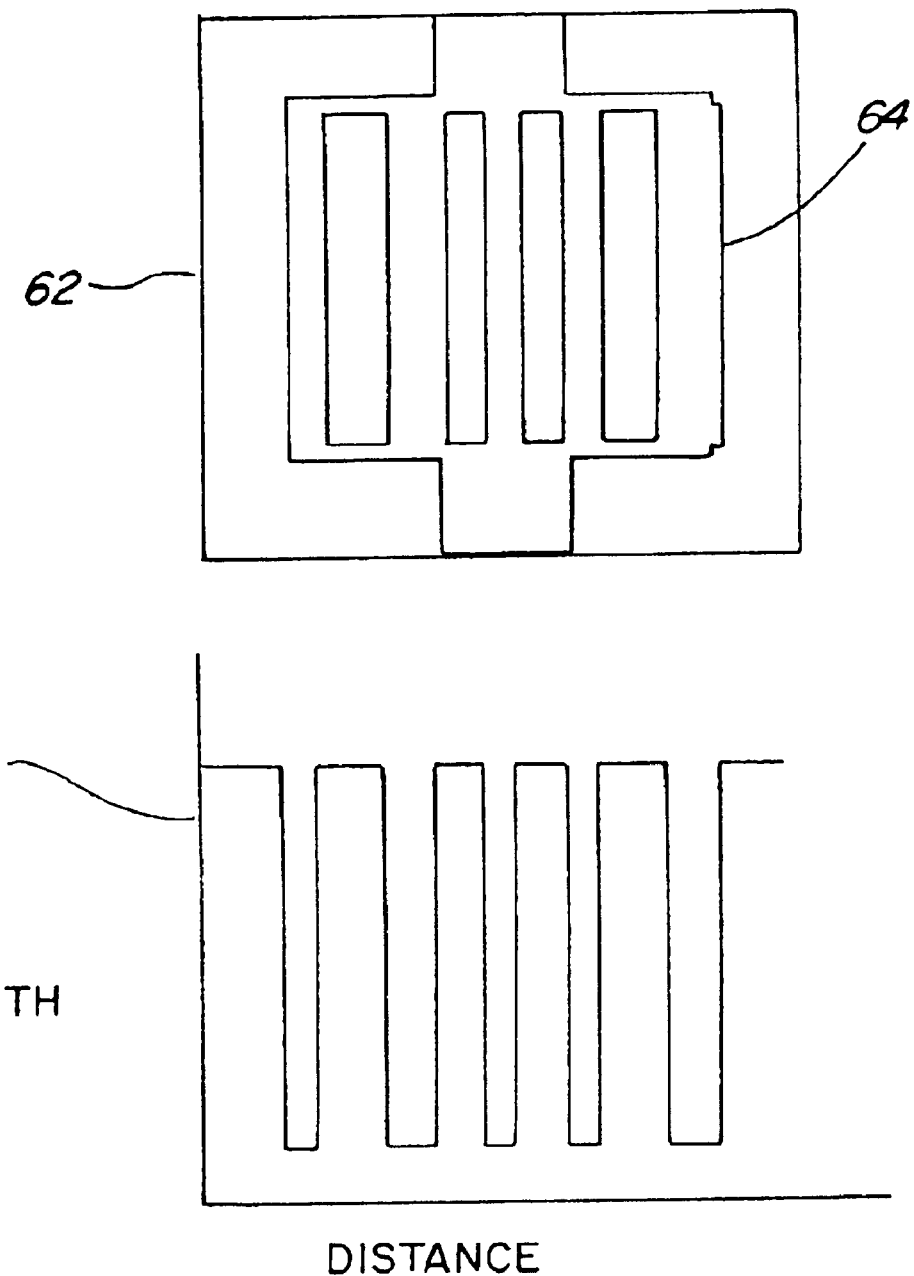
FIGS. 6A and 6B illustrates how tickets are read employing the present invention.

FIG. 6A illustrates how tickets are read employing the present invention. Formed on ticket 62 is pattern 64, typically made from a dried ink film. Upon illumination of ticket 62 with a light source (an LED for example), a characteristic signal can be detected on the other side of the ticket by a photodetector. This signal is shown on graph 66 and shows the signal strength versus lateral distance on the ticket. As can be seen, a characteristic pattern results corresponding to the translucent/patterned regions of the ticket. The opaque regions correspond to areas of low signal strength and the translucent regions correspond to the areas of high signal strength.

Figure 6B:
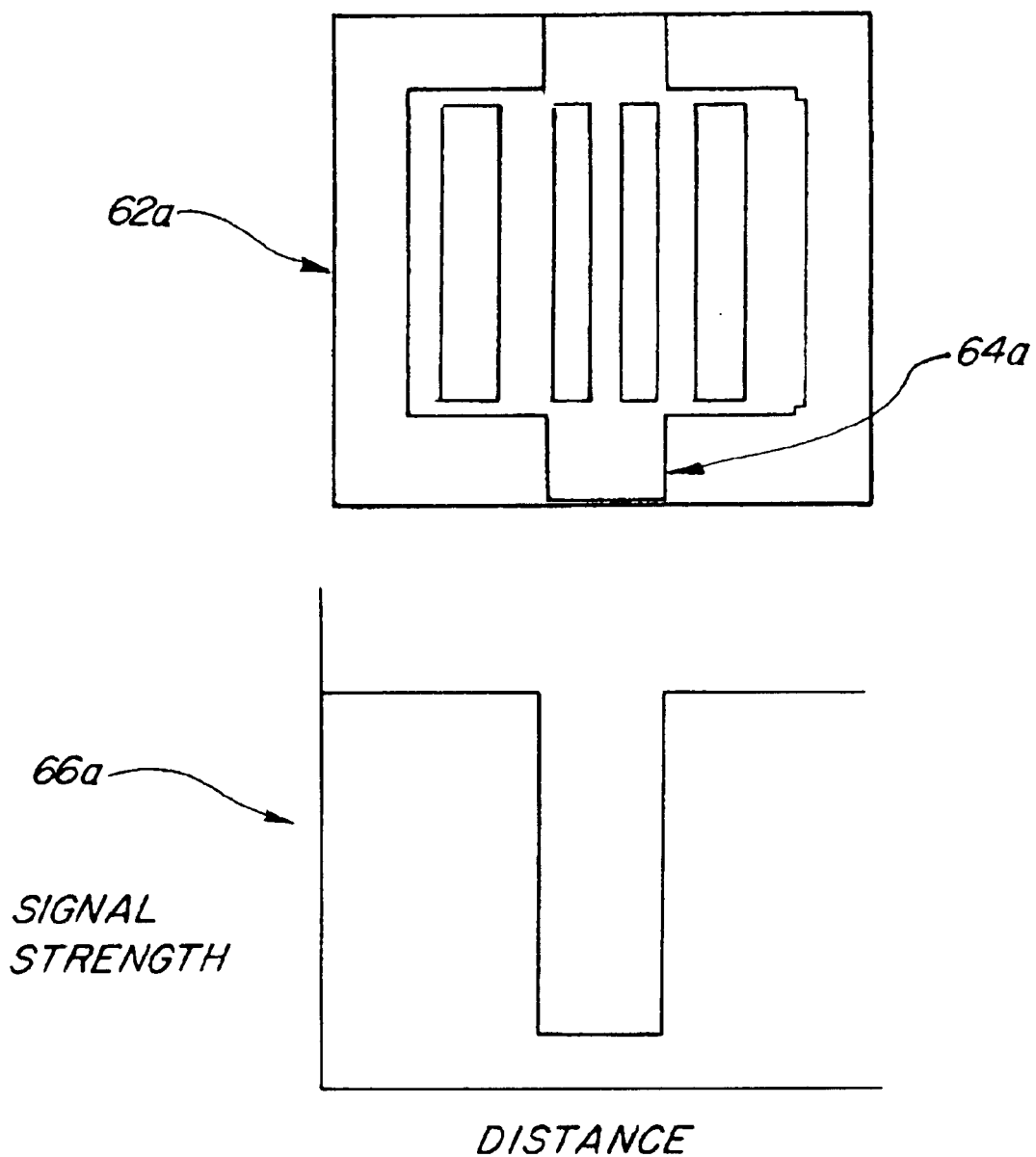

Similarly, FIG. 6B shows a ticket 62a and a pattern 64a, typically made from a dried ink film. Graph 66a shows the signal strength versus lateral distance when a light source illuminates the ticket 62a, in combination with a photodetector, at the location of the pattern 64a indicated by the directional arrow, at the side edge of the ticket (square opaque area). There will be no variation of signal strength relative to the positioning of the photodetector/illumination along this section of the pattern 64a.

It will therefore be appreciated that a method to count tickets includes providing a translucent ticket with an opaque pattern with translucent portions, providing a light source on a first side of the ticket, providing a detector on a second side of the ticket and providing relative motion between the ticket and the detector. The pattern and translucent portions are detected with the detector. Additionally, a running total of the number of tickets, verified tickets and non-verified tickets can be incremented.

Figure 7:
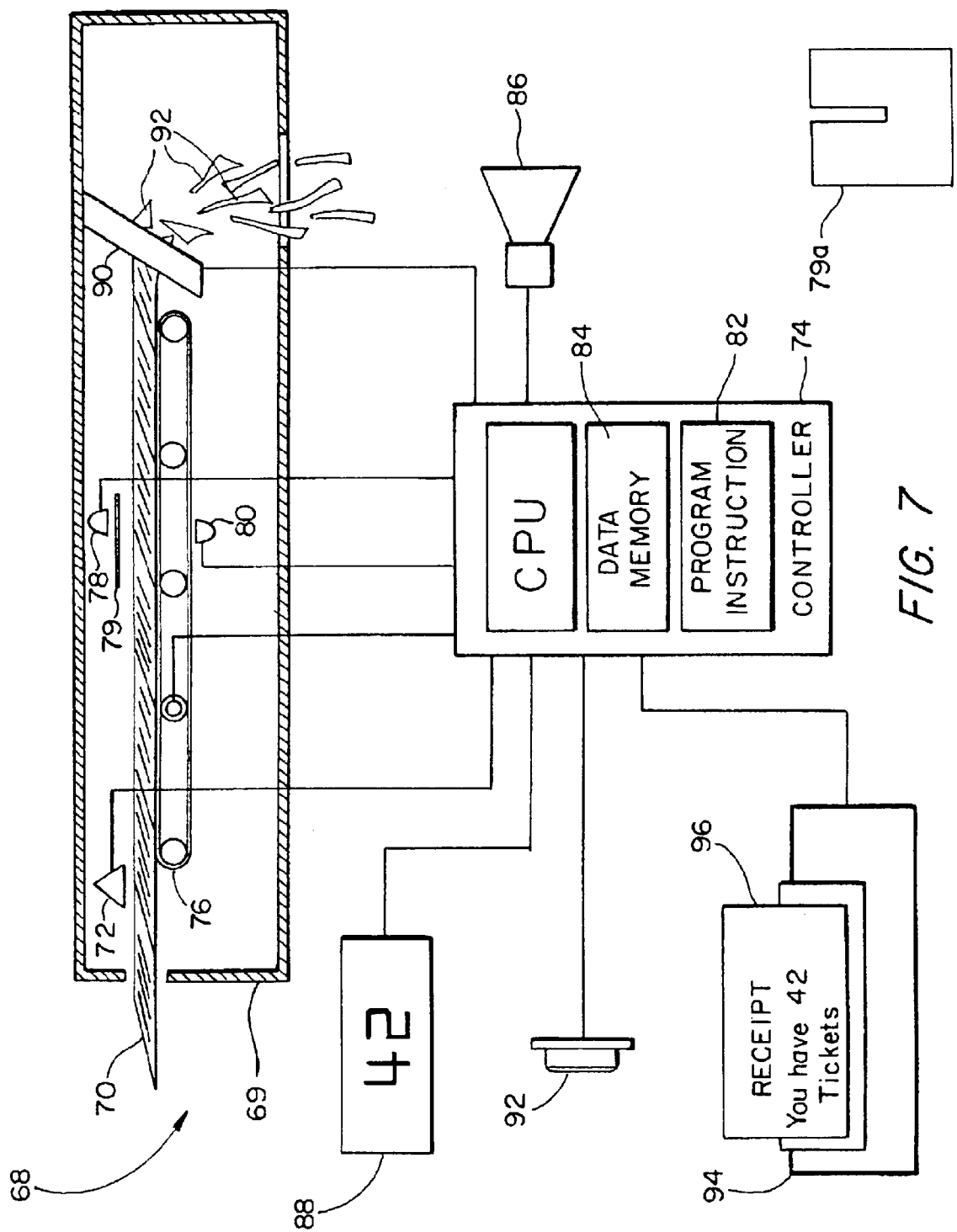
FIG. 7 is a block diagram of a ticket counter in a preferred embodiment of the present invention.

FIG. 7 is a block diagram of a ticket counter 68 in a preferred embodiment of the present invention. Housing 69 contains ticket counter 68. Tickets 70, which have a pattern/barcode, are inserted into the ticket counter 68. A ticket sensor 72 sees the ticket 70 and indicates a signal to the controller 74. The controller 74 turns on the ticket transport 76 and moves the ticket 70 in the direction of the ticket chopper 90, which runs concurrently with the ticket transport 76. As the ticket 70 is conveyed by the ticket transport 76, the ticket 70 passes between the barcode backlight 78 and the barcode detector 80. Also included is a focusing slit 79 that is used to focus the illumination coming from barcode backlight 78. An enlarged/top view of the focusing slit 79 is shown at 79a. Upon sensing the presence of a barcode on the ticket 70, the barcode detector 80 sends a signal, containing the barcode information, to the controller 74. The program instructions 82, in the controller 74, will determine if the barcode pattern matches the pattern for a legitimate ticket. The program instructions 82 counts the number of valid and invalid ticket counts in the data memory 84. In addition, the controller 74 might send signals to the sound output 86 to generate music to indicate the counting of tickets to a customer (not shown) and display a running total of the tickets 70 counted via ticket count display 88. When the ticket 70 reaches the ticket chopper 90, it is destroyed into shredded tickets 92, so that the ticket 70 cannot be used again. When there are no more tickets 70 to be counted, the ticket sensor 72 sends a signal indicating the absence of tickets to the controller 74. After a short time delay (to convey all of the tickets 70 to the shredded tickets 92), the controller 74 shuts off the ticket transport 76. After all the tickets 70 have been counted, a customer may request a receipt by depressing print receipt button 92 that activates receipt printer 94. Receipt 96 is then printed by receipt printer 94.

It will therefore also be appreciated that an apparatus for counting tickets includes a housing and a transport device coupled to the housing capable of guiding at least one ticket into the housing and the tickets are printed with a pattern. A light source is positioned on a first side of the ticket and a detector positioned on a second side of the ticket. A signal analyzer coupled to the detector is used to analyze the signal provided by the detector. The signal analyzer can be a controller that counts, analyzes and determines barcode similarity relative to a location code. The location code is a pattern stored in the controller memory that it uses to determine if the pattern on a ticket is valid or not. The controller can also contain a digital processor or CPU, a data memory and a program instruction.

The apparatus can also include a ticket chopper, a ticket count display and a receipt printer. The ticket chopper is more fully described in U.S. Provisional Patent Application No. 60/255,637, incorporated herein by reference.

FIG. 8 is an exemplary printing process 98 for printing a pattern on a set of tickets. The printing process 98 begins at operation 100 where a plurality of tickets are first obtained. The tickets are then loaded into a ticket printing machine in operation 102. In operation 104, a pattern is printed on one side of each ticket. Printing process 98 then terminates at operation 106.

Printing process 98 can also optionally include operation 104a where the pattern is printed on the other side of the ticket. Printing the pattern on both sides of the ticket is usually only necessary when the ticket paper is of a very dark color which necessitates the use of a brighter light to see through the paper.

Operation 104b can optionally also be performed. This involves covering one or both patterns with a dark colored non-opaque ink. Operation 104b advantageously prevents individuals from making counterfeit tickets via the use of a copier machine. If a legitimate ticket is copied that has a pattern covered by a dark colored non-opaque ink, the counterfeiter will only see a dark block on the copy that is useless in the ticket counter embodiment of the present invention. The copied ticket does not have the pattern and will not be counted by the ticket counter.

Another advantage of this embodiment is that a conventional reflective optical reader can not read the pattern covered by the dark colored non-opaque ink.

One skilled in the art will readily recognize that operations 104, 104a and 104b can all be done interchangeably. One skilled in the art will also readily recognize that the pattern can be printed on one side of the ticket and both sides can be covered by the non-opaque ink.

In view of the foregoing, it will be appreciated that a method for printing a pattern on a ticket includes obtaining a plurality of translucent tickets, feeding the plurality of translucent tickets into a ticket printing machine, printing an opaque pattern on one side of each individual translucent ticket and covering the opaque pattern with a dark colored non-opaque ink. Optionally, the pattern and dark colored non-opaque ink can be printed on both sides of the ticket. Also, the pattern can be printed on one side of the ticket and the non-opaque ink can be printed on both sides.

Preferred ticket stock includes computer type printer paper. Example opaque and non-opaque inks can be obtained from the Environmental Inks and Coatings Corp. of Holland, under the brand names of Environmental Inks.

While this invention has been described in terms certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. An apparatus for counting tickets comprising;
   a housing;
   a transport device coupled to the housing and capable of guiding at least one partially translucent ticket with an opaque pattern printed thereon into the housing;
   a light source positioned on a first side of the partially translucent ticket for passing light through said partially translucent ticket but not said opaque pattern;
   a detector positioned on a second side of the partially translucent ticket for receiving light passing through said partially translucent ticket from the light source, and for generating a signal based on the light passing through the translucent ticket; and
   a signal analyzer coupled to the detector to analyze the signal provided by the detector and determine a ticket count based on said signal.

2. The IC card of claim 1,
   wherein a data received by said transmission circuit has a structure in accordance with the standard of ISO/IEC 14443-3
   said transmission circuit includes an analog circuit part for modulating a data received from the outside into a digital data and outputting said digital data,
   said IC card further comprises preset signal generation means for giving said analog circuit part a preset signal that is active during a period other than a period when said transmission circuit is receiving a data, and
   said analog circuit part sets an output thereof to a logical high level in response to the active preset signal.

3. The apparatus of claim 2 wherein the controller comprises a digital processor, a data memory and a program instruction.

4. The apparatus of claim 1 further comprising a ticket chopper.

5. The apparatus of claim 1 further comprising a ticket count display.

6. The apparatus of claim 1 further comprising a receipt printer.

7. A method for printing a patter on a ticket comprising:
   obtaining a plurality of translucent tickets;
   feeding the plurality of translucent tickets into a ticket printing machine;
   printing an opaque pattern on one side of each individual translucent ticket, such that there is an alternating pattern of translucent and opaque portions; and
   covering the opaque pattern with a dark colored non-opaque ink;
   wherein printing the opaque pattern is printed on both sides of each individual translucent ticket and the opaque patterns on both sides of each individual ticket are covered with the dark colored non-opaque ink.

8. A method for printing a pattern on a ticket comprising:
   obtaining a plurality of translucent tickets;
   feeding the plurality of translucent tickets into a ticket printing machine;
   printing an opaque pattern on one side of each individual translucent tickets, such that there is an alternating pattern of translucent and opaque portions; and
   covering the opaque pattern with a dark colored non-opaque ink;
   wherein the opaque pattern is printed on one side of each individual translucent ticket and both sides of each individual ticket are covered with the dark colored non-opaque ink.

* * * * *